J. OUIMETTE.
EYE TESTING DEVICE.
APPLICATION FILED MAR. 5, 1909. RENEWED JUNE 23, 1913.
1,084,561.
Patented Jan. 13, 1914.
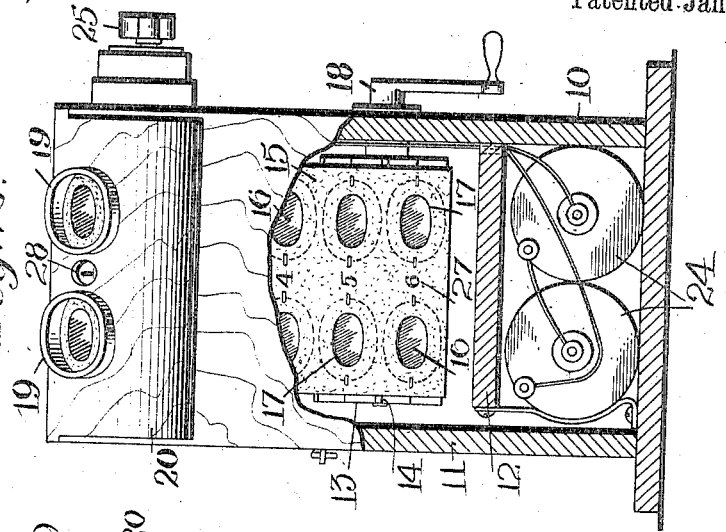
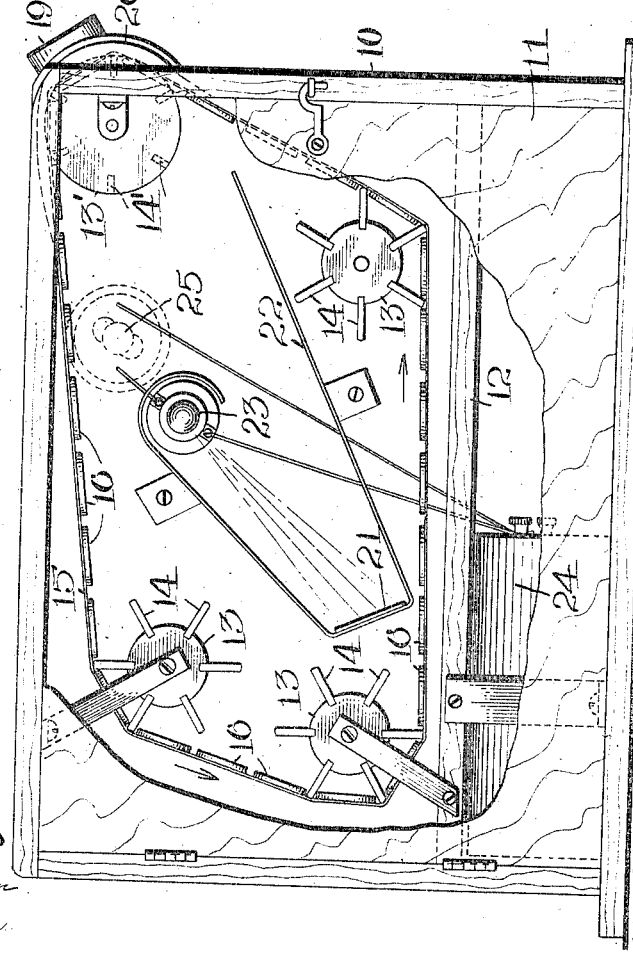
Witnesses
C. F. Wesson
E. M. Allen
Inventor
J. Ouimette
by Attorneys
Southgate
& Southgate

UNITED STATES PATENT OFFICE.

JOSEPH OUIMETTE, OF SOUTHBRIDGE, MASSACHUSETTS.

EYE-TESTING DEVICE.

1,084,561. Specification of Letters Patent. Patented Jan. 13, 1914.

Application filed March 5, 1909, Serial No. 481,464. Renewed June 23, 1913. Serial No. 775,416.

*To all whom it may concern:*

Be it known that I, JOSEPH OUIMETTE, a citizen of the United States, residing at Southbridge, in the county of Worcester and State of Massachusetts, have invented a new and useful Eye-Testing Device, of which the following is a specification.

This invention relates to a device for testing the eyes and it is designed as a substitute for the frame having movable lenses commonly used by opticians for this purpose and for the various devices which have been employed for supporting the object to be observed.

The principal objects of the invention are to provide a simple, convenient and easily manipulated device whereby a patient can test his own eyes in a very convenient manner without the aid of an optician or other assistant, so that the machine can be set up in a store or other public place and operated by the public for a small charge; to provide a construction in which the sight openings through which the patient observes the object inside will be conveniently located; to provide a simple and convenient arrangement of light and object to be observed inside the casing; to provide a simple, inexpensive, and practicable arrangement for supporting an endless series of lenses in the casing; and generally to improve and simplify devices of this character.

Reference is to be had to the accompanying drawings, in which—

Figure 1 is a side elevation of one embodiment of the invention with a part of the wall removed to show interior construction; and Fig. 2 is an end view of the same also partly broken away to show the interior.

The device is shown as comprising a rectangular frame 10 having an opening at one side closed by a door 11. Within this frame is a platform 12 over which are supported a plurality of wheels 13 and 13' each having radiating spokes 14 and 14'. These wheels are arranged to rotate freely in the casing and to support an endless carrier 15 having two parallel series of lenses 16 thereon, the carrier having openings 17 registering with the several lenses. The lenses themselves are taken advantage of for propelling the endless chain or carrier as the spokes 14 and 14' are at a distance apart at their ends substantially equivalent to the width of the lenses, so that the spokes come between each two adjacent lenses. As one of the wheels is rotated by means of a shaft and handle 18 extending through the casing and located on the right-hand side of the same, all the wheels will be rotated and the endless carrier taken around so as to bring the several lenses successively in front of the sight openings 19 which are provided in the convex projection 20 on the casing. This projection forms a rounded extension at the upper front corner of the casing and the sight openings are located in it at an inclination so that they are in a most convenient position for the patient. The endless carrier is guided through this projection by the wheel 13' so as to bring the lenses between the sight openings and the object 21 which is to be observed. It will be seen that the wheel 13' is formed of two disks having the spokes 14' extending between them so that there will be no shaft or other obstacle between the sight opening and the object 21.

The object 21 is located in a frame 22 supported within the casing and in the endless carrier and between the strands of the latter, said frame being inclined downwardly from the sight opening to the object, and above the object and within said frame is located a lamp 23 designed to be energized by means of a battery 24 located under the platform 12 which is controlled by a turn-button 25 located in convenient position on the same side of the casing as the handle 18.

Each lens is provided with a number 27 which shows through an opening 28 in the projection 20 so that when a person uses the device he can see what lens best suits his eye and take down the number and then order his glasses or spectacles accordingly.

While I have illustrated and described a preferred embodiment of the invention, I am aware that many modifications can be made therein by any person skilled in the art without departing from the scope of the invention as expressed in the claims. Therefore, I do not wish to be limited to all the features of construction shown, but What I do claim is:—

1. In an eye testing device, the combination of a rectangular casing having a projection at one upper corner thereof, a pair of sight apertures in said projection located on an inclination, an object to be seen in the casing, an endless carrier in the casing extending into and through said projection, lenses carried by said carrier, means for supporting the carrier comprising a skeleton wheel located in said projection between said sight apertures and object, and means for operating the carrier.

2. In an eye-testing device, the combination of a rectangular casing having a pair of sight apertures, an endless carrier inside the casing extending just behind said sight apertures, wheels near three corners of the casing having radiating spokes for engaging the endless carrier, and a fourth wheel located directly behind the sight apertures and having two disks provided with spokes between them located near their peripheries, each pair of spokes having a clear space between the same, whereby the inside of the casing can be observed through the sight apertures and through said fourth wheel.

3. In an eye-testing device, the combination of a casing having sight apertures at one of its upper corners and located on an inclination, an endless carrier inside the casing extending just behind said sight apertures, three wheels within the casing having radiating spokes for engaging the endless carrier, and a fourth wheel located directly behind the sight apertures and consisting of two disks having radiating spokes located between them near their peripheries, whereby there will be no obstruction to the vision through said fourth wheel.

In testimony whereof I have hereunto set my hand, in the presence of two subscribing witnesses.

JOSEPH OUIMETTE.

Witnesses:
A. E. FAY,
C. F. WESSON.